United States Patent [19]
Eger

[11] Patent Number: 5,503,352
[45] Date of Patent: Apr. 2, 1996

[54] LIGHT-DUTY BOX-WING AEROPLANE

[76] Inventor: Vladimir S. Eger, ulitsa Valtera Ulbrikhta, 14, kv.115, Moscow, Russian Federation

[21] Appl. No.: 238,707

[22] Filed: May 5, 1994

[51] Int. Cl.$^6$ .................. B64C 3/10; B64C 5/06; B64C 39/12
[52] U.S. Cl. .................. 244/45 R; 244/13; 244/34 A; 244/91; 244/225
[58] Field of Search .................. 244/13, 35 R, 244/34 A, 45 A, 215, 91, 225

[56] References Cited

U.S. PATENT DOCUMENTS

| | | | |
|---|---|---|---|
| 3,834,654 | 9/1974 | Miranda | 244/13 |
| 3,868,073 | 2/1975 | King | 244/34 A |
| 3,954,231 | 5/1976 | Fraser | 244/225 |
| 3,981,460 | 9/1976 | Ratony | 244/13 |
| 4,336,913 | 6/1982 | Hall | 244/13 |
| 4,541,593 | 9/1985 | Cabrol | 244/91 |
| 4,828,203 | 5/1989 | Clifton | 244/45 A |
| 4,881,701 | 11/1989 | Bullard | 244/45 A |
| 5,336,180 | 11/1994 | Wainfan et al. | 244/45 A |

FOREIGN PATENT DOCUMENTS

| | | | |
|---|---|---|---|
| 2579169 | 3/1985 | France | 244/45 A |
| 2679866 | 2/1993 | France | 244/13 |
| 427186 | 4/1935 | United Kingdom | 244/13 |

OTHER PUBLICATIONS

*Aviation Week & Space Technology*, 21 May 1984, pp. 160, 159, 157.
Rhine–Flugzeugbau "Fantrainer" and English Translation 1986.
*Flight International*, 4 Apr. 1987, pp. 16 & 17.
*Flight International*, 5 Sep. 1987, p. 24.
*Flight International*, 11 Feb. 1984, pp. 392 & 408.

*Primary Examiner*—Andres Kashnikow
*Assistant Examiner*—Virna Lissi Mojica
*Attorney, Agent, or Firm*—Ladas & Parry

[57] ABSTRACT

A light-duty multipurpose aeroplane has a fuselage having a cabin at its center, a tail portion with a pusher propeller in a ring and a front portion with an all-swiveling horizontal "canard" type empennage. The wings of the aeroplane are articulated with low-mounted and high-mounted wing segments with opposite sweeps. The tips of the wing segments are connected with arrow-shaped pylons provided with heading control rudders.

11 Claims, 8 Drawing Sheets

LIGHT-DUTY BOX-WING AEROPLANE

FIELD OF THE INVENTION

The invention relates to aircraft engineering and, in particular, to the design and aerodynamic configuration of the light-duty multipurpose aeroplanes.

DESCRIPTION OF THE INVENTION

For light-duty small aeroplanes flying at low speeds their aerodynamic diagrams or aerodynamic configurations are particularly important, because they define to a large extent the flying quality.

The traditional monoplane type diagrams are being replaced at the present by ever more complicated diagrams with the intent to improve the technical characteristics, the importance of which is dictated by the consumer market. In this connection, flying qualities and service properties which are not crucial to aerodynamic configuration become important. This group of new qualities includes convenience of handling, handling-failure safety, redundancy of control surfaces, structural-failure safety, variable stability, etc. At the same time, advances in aerodynamics and improvement of calculation methods offer more freedom to solutions; to deviate earlier was hazardous because the consequences were then unknown.

Therefore, there has been in the last few years a sharp increase in the quantity of original diagrams and configuration solutions, especially in the field of light-duty aircraft.

Similar to the proposed technical solution are:

aeroplanes with a pusher propeller disposed within a ring, such as the "Fentreiher" of the "Rhine-Flugzeugbau" Firm (FRG) and the "Optica" of the "Edgley" Firm (Great Britain);

aeroplanes with an articulated wing, which have been developed on the basis of a biplane diagram and are being tested intensively at the present time in the wind tunnels of NASA (USA) for large-size commercial aeroplanes (FLIGHT INTERNATIONAL 4, 1987, p. 16).

The technical solution most similar to the present invention is the design realized only in a single aeroplane created by amateur craftsmanship in Australia by Charles Ligeti, a Czech immigrant, i.e. the LGT Stratos (FLIGHT INTERNATIONAL, 6, 1986, p. 46). This is a single-seat powered glider aeroplane having an articulated wing of low-mounted and high-mounted swept-back wing segments connected at their tips by pylons. In the tail portion of the fuselage there is a pusher propeller mounted inside a ring.

The disadvantages of the aeroplane configuration last described above include the problematic character of operating characteristics if this aeroplane is re-designed for carrying more than three passengers over routes as long as 1500 km with earthen runways.

SUMMARY OF THE INVENTION

It is an object of the present invention to create a light-duty multipurpose aeroplane having high carrying properties and enhanced stability.

The object is met in an aeroplane having articulated wings each consisting of low-mounted and high-mounted wing segments connected at their tips by pylons as well as a pusher propeller mounted in a ring at the tail portion of fuselage. The upper and lower wings are spaced apart along the aeroplane's longitudinal axis and have mutually opposite sweeps, thus forming a rhombus shape in the plan view, and in that pitch control means and heading control means are provided.

According to the preferred embodiment, the lower wing segments may have a back sweep and the upper wing segments, a forward sweep. The opposite sweeps of the low-mounted and high-mounted wing segments permit optimum advantages of air flow around the wings, i.e. circulation, thus ensuring a more uniform lift distribution over the wing span.

The upper wing segments can be installed at the top of the pusher propeller ring. The embodiment with the high-mounted swept-forward wing segment located at the top of the pusher propeller ring makes it possible to isolate that wing from burbling if the flow separates from the low-mounted wing at large angles of incidence, due to drawing in of the separated air flow by the propeller.

Lower swept-forward wing segments can be installed at the bottom of the pusher propeller.

The root and tip sections of the wing can be spaced apart heightwise, e.g. in a vertical direction, to different degrees so that symmetrical trapezoids are formed.

It is advisable to ensure that the vertical spacing at the root section of the wing is at least as great as one length of its root chord, whereas the spacing at the root section along the axis is made in conformity with the geometrical dimensions of the fuselage.

The connection of the wing tips with pylons makes it possible to create a rigid load-bearing structure—a wing "box"—forming two symmetrical trapezoids in the front view. Such a structure reduces deformation in the root sections of the wings and improves fatigue strength, and also, in combination with the general configuration, improves both general and dynamic strength.

By using various transverse V's for the wings, one can ensure the largest vertical spacing between the root sections of the two wing segments on each side of the fuselage and provide favorable conditions, by means of an arrow-shaped pylon connecting the tips of the wings, for creating a wing box that is rigid from the viewpoint of bearing its load. With this, deformations become substantially smaller in the root sections of the wings so that the fatigue strength of the aeroplane is enhanced. This is important when composite materials based on epoxy resin are used for the wings as these materials are characterized by low bending strength.

In the final analysis, the design of an articulated wing in combination with the general configuration makes it possible to reduce the weight of the aeroplane, to increase the carrying load and to improve both general and dynamic strength.

The claimed relationship between the spacings of the chords of the tip and root sections of the wings both heightwise and lengthwise was obtained from the results of wind-tunnel tests. The calculation of the chord spacing makes it possible to obtain a flow under super-critical conditions that avoids snapping the aeroplane into a spin.

According to one of the embodiments, the pitch control means is implemented in the form of a front-set horizontal "canard" type empennage. A front-set horizontal "canard" type empennage ensures a substantial improvement in the carrying properties of the aeroplane and improves its stability.

The front-set horizontal empennage and high-mounted and low-mounted wings are preferably spaced along the longitudinal and heightwise axes of the fuselage relative to one another.

An all-swiveling horizontal "canard" type empennage substantially improves aeroplane controllability in the case of a large spread of the center-of-gravity locations, since this unit, depending upon its angle of incidence, moves the center of pressure forward, thus adjusting the degree of aeroplane stability.

Pitch control is attained with elevators disposed on wings and by the use of the front-set horizontal empennage. The simultaneous utilization of these means makes it possible to control the lift directly. Elevators disposed on the high-mounted wing enable the wing to be used as an additional horizontal empennage (stabilizer), thus improving efficiency of control of the aeroplane under normal conditions.

Heading control is attained with the help of rudders on the wing-tip pylons and on a tail fin. The simultaneous utilization of these means makes it possible to control the lateral force directly.

According to another embodiment, an additional rudder is provided in the propeller slipstream, this rudder being made as a fin extension. A similar slip-stream rudder can also be provided in the horizontal plane for pitch control at low speeds when other means are less efficient.

BRIEF DESCRIPTION OF THE DRAWINGS

The invention will now be described in more detail by way of examples with reference to the drawings which show various embodiments thereof, in which.

DESCRIPTION OF THE PREFERRED EMBODIMENTS

Figure 1:
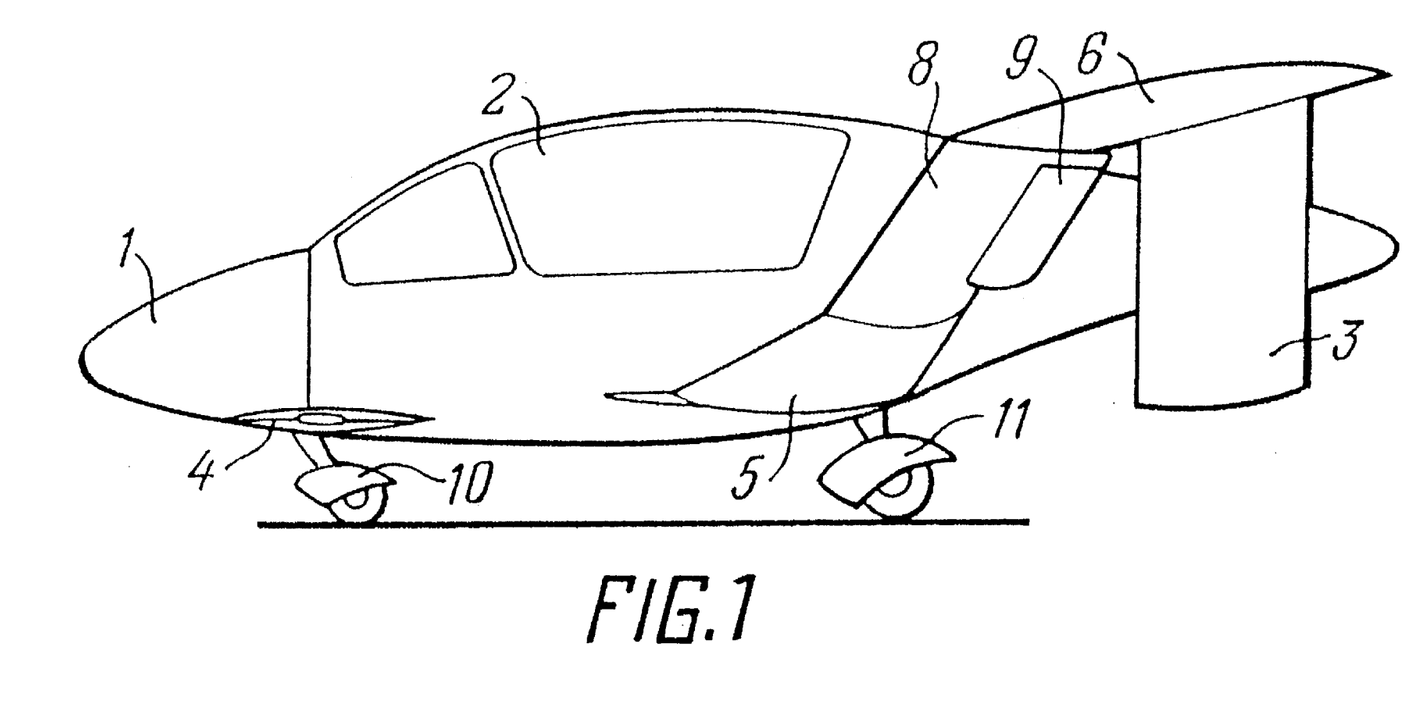
FIG. 1 is a lateral view of an aeroplane according to the invention.
Figure 2:
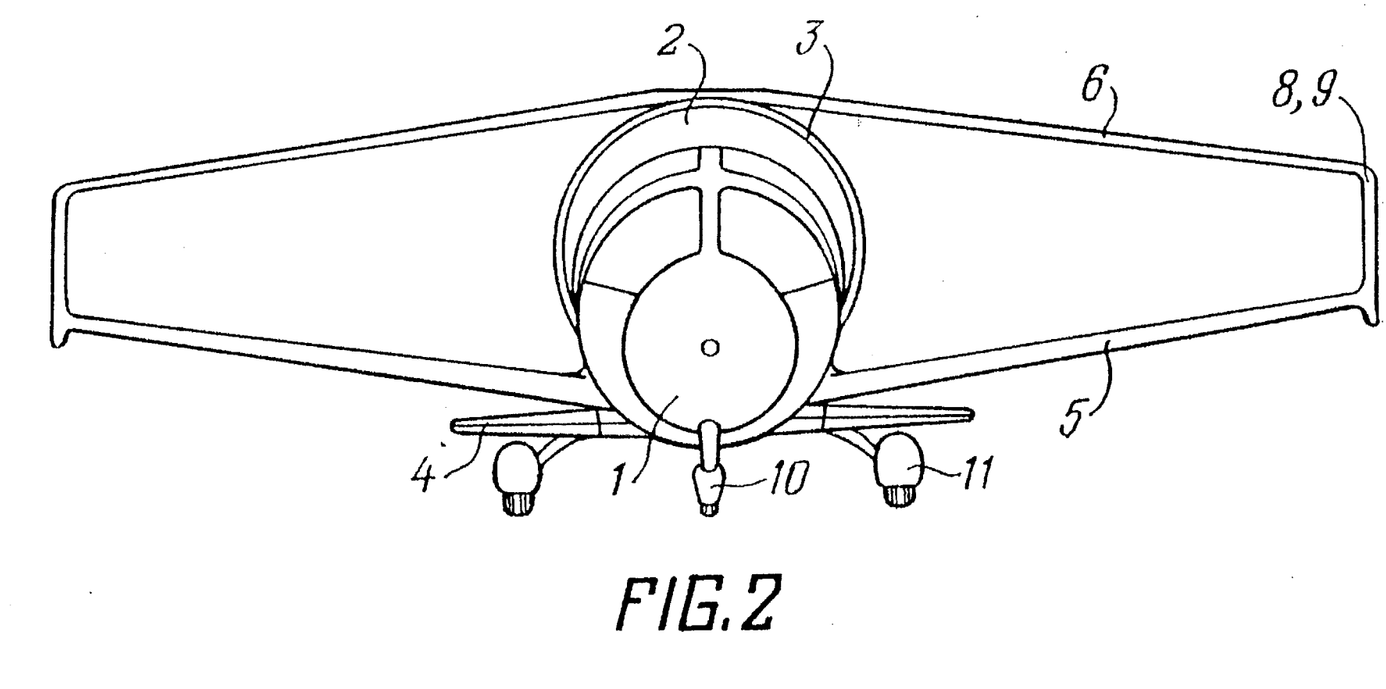
FIG. 2 is a front view of the aeroplane of FIG. 1.
Figure 3:
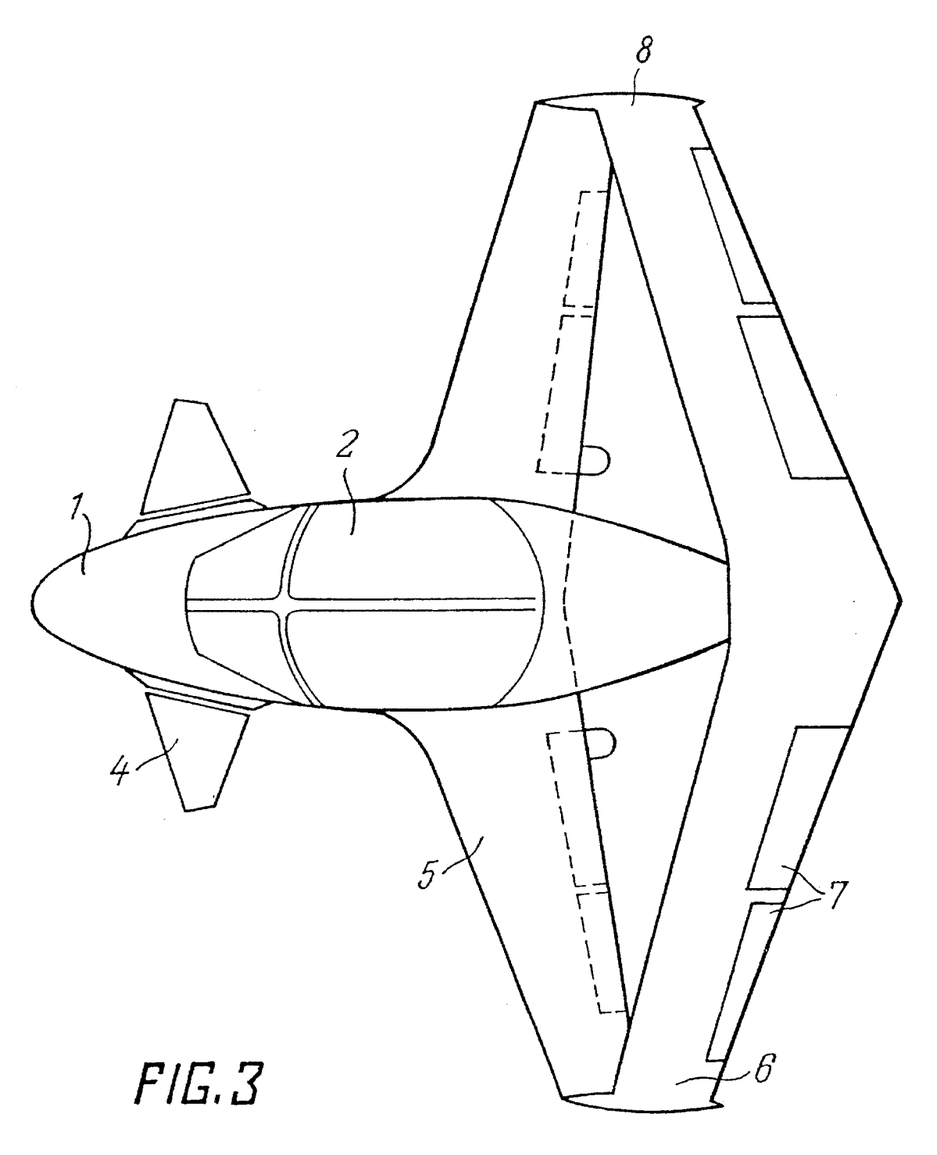
FIG. 3 is a plan view of the aeroplane of FIG. 1.

As shown in FIGS. 1 to 3, a light-duty multipurpose aeroplane comprises a fuselage 1 having a cabin 2 arranged at its caner. At the tail portion of the fuselage, a pusher propeller is mounted in a ring 3. The front portion of the fuselage is provided with an all-swiveling horizontal "canard" type empennage 4.

The wings of the aeroplane are articulated. Each consists of low fuselage-mounted swept-back wing segments 5 and high-mounted wing segments 6 that sweep forward from a the top of the ring 3 and are provided with elevators 7 (FIG. 3).

The tips of the high and low wing segments are respectively connected with arrow-shaped pylons 8 provided with heading control rudders 9.

A front undercarriage and a rear undercarriage 11 are attached to the fuselage.

Figure 4:
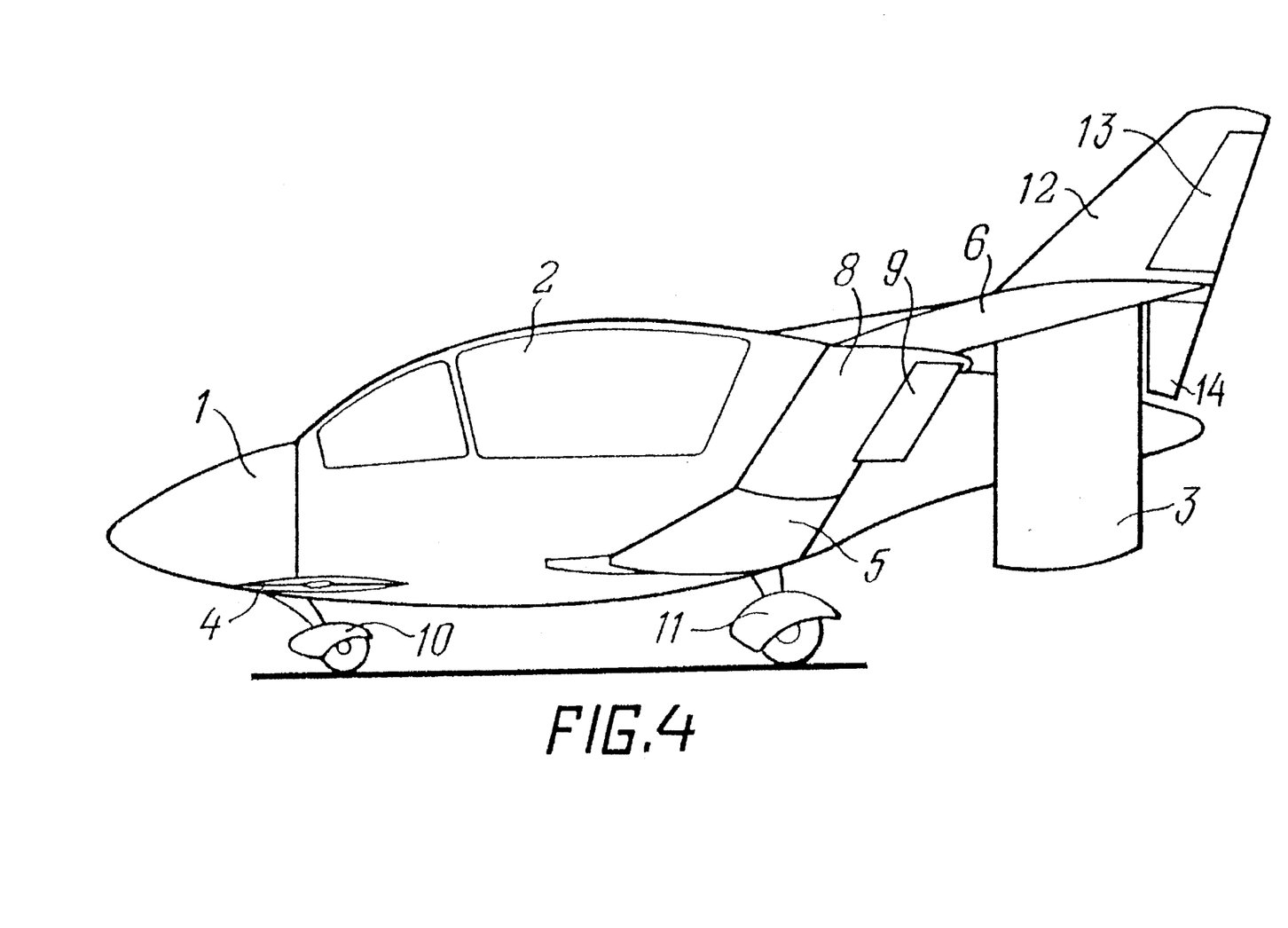
FIG. 4 is a lateral view of another embodiment of an aeroplane according to the invention.
Figure 5:
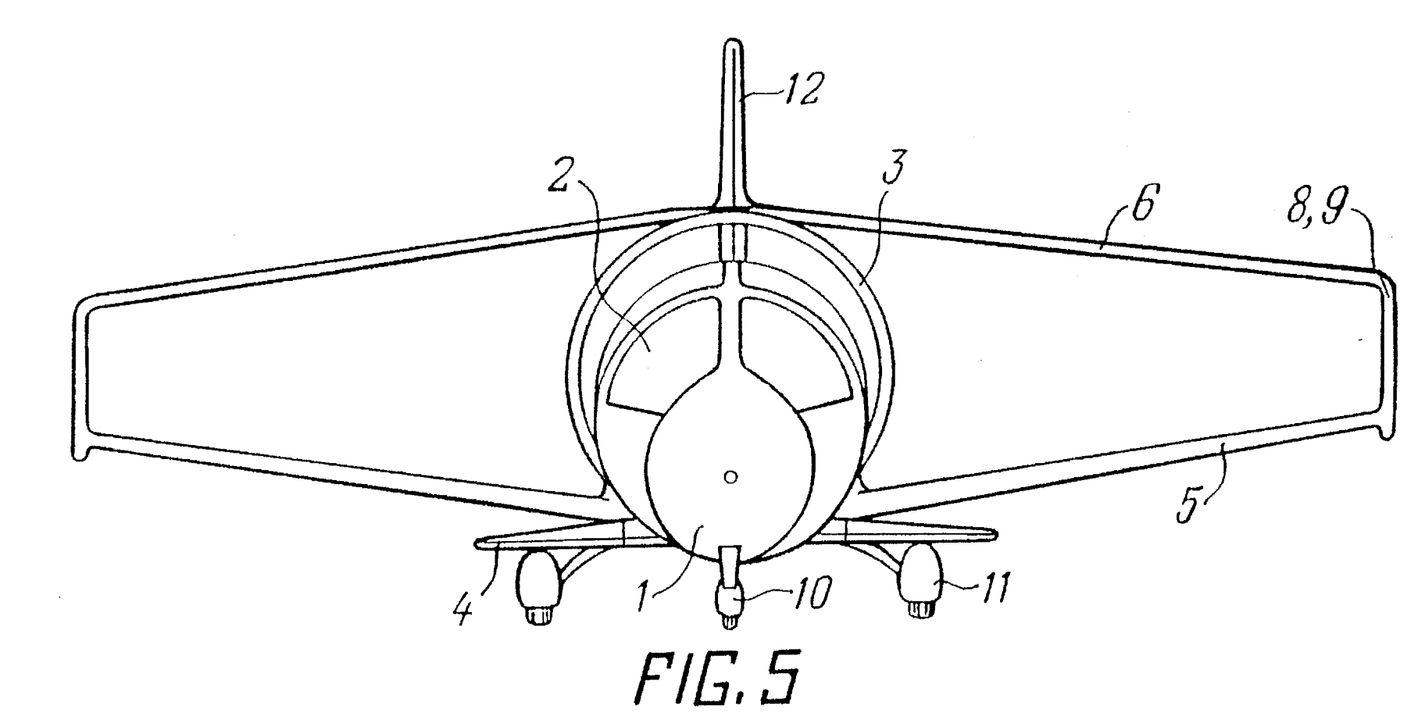
FIG. 5 is a front view of the aeroplane of FIG. 4.
Figure 6:
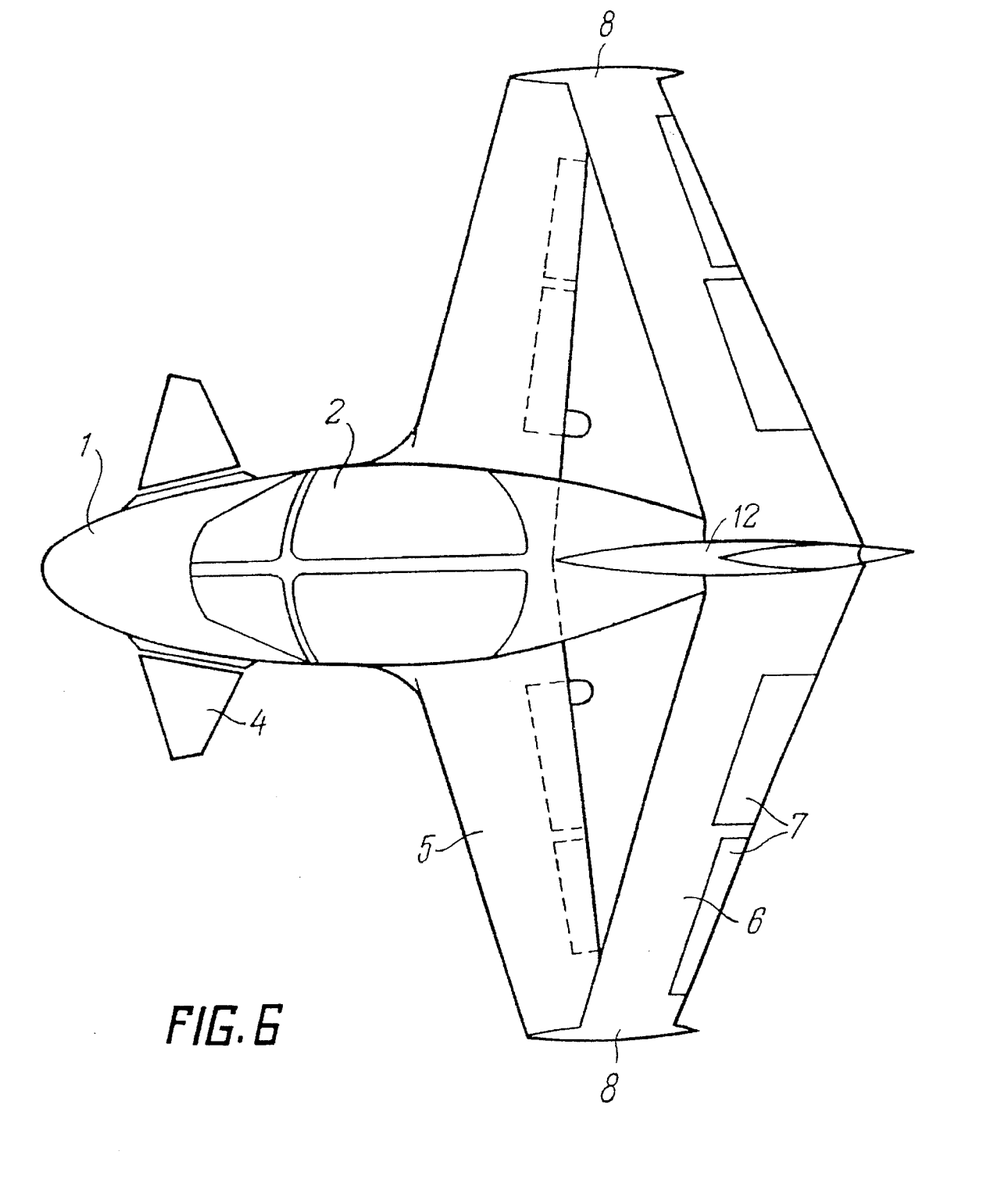
FIG. 6 is a plan view of the aeroplane of FIG. 4.

In the embodiment of the aeroplane design according to FIG. 4, there is a fin 12 mounted at the top of the ring 3 enclosing the pusher propeller. The fin is provided with a heading control rudder 13. Another turning rudder 14 is mounted in the propeller slipstream.

In this embodiment, the arrow-shaped pylons 8 may carry further heading control rudders 9, as shown, but do not have to.

Figure 7:
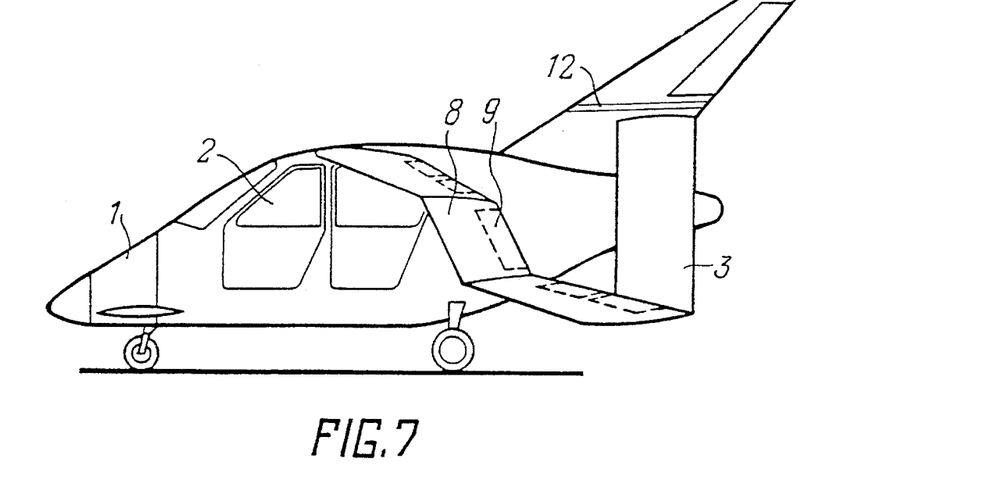
FIG. 7 is a lateral view of another embodiment of an aeroplane with another arrangement of the wings according to the invention.
Figure 8:
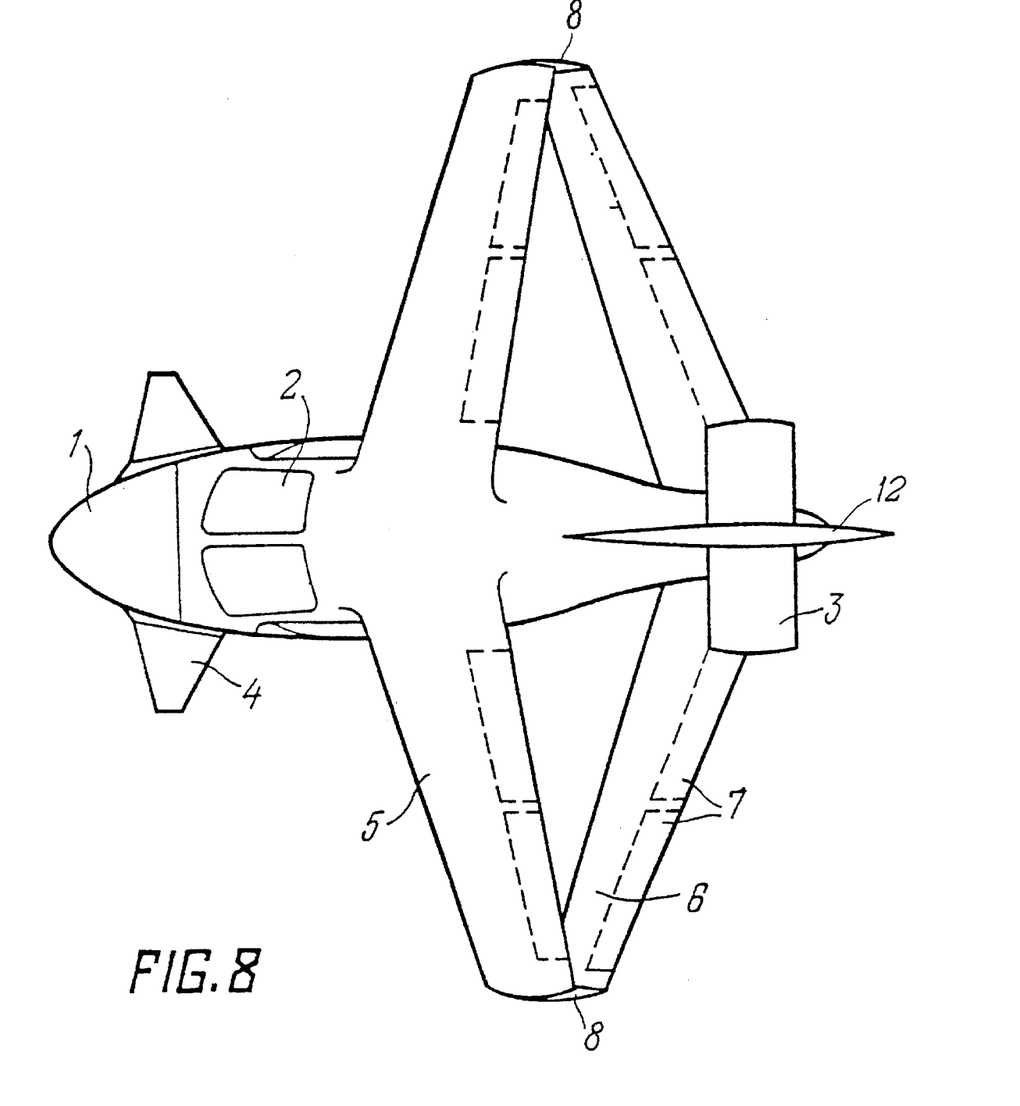
FIG. 8 is a plan view of the aeroplane of FIG. 7.
Figure 9:
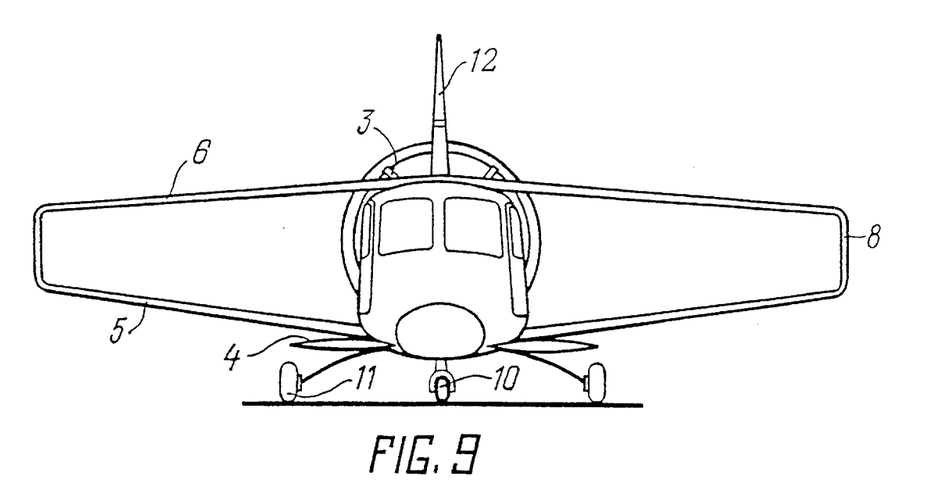
FIG. 9 is a front view of the aeroplane of FIG. 7.

FIGS. 7 to 9 show an embodiment of the aeroplane having an articulated wing with the swept-back wing segments 5 being high-mounted and the swept-forward wing segments 6 being low-mounted, attached to the bottom of the ring 3 and provided with elevators 7.

An all-swiveling fin 12 is installed at the top of the fuselage for heading control instead of the rudder 13 of FIG. 4.

These aeroplanes have a number of material advantages, namely:

improvement in carrying properties;

improvement in stability and controllability;

improvement in fatigue strength;

direct control of the lift and lateral forces; and safety and convenience of aeroplane-handling.

The designs of these light-duty multipurpose aeroplanes have been implemented in the development of the "SAVIAT E-1" aeroplane made of composite materials based on glass fibers.

When used for individual purposes, the aeroplane is designed for operation by an inexperienced pilot who has taken only a course of initial training. The design therefore takes into consideration that the aeroplane should be able to land on a motor road, a street and other areas of terrain not designed for the landing of an aeroplane. On this basis, the wing span was selected to be equal to 7 m, the length of the aeroplane, to about 6 m, and the diameter of the fuselage, to about 1.5 m. Since a pusher propeller is installed, the engine is protected against being hit by various foreign objects.

The data of wind-tunnel testing indicate that the object of the present invention—i.e., optimization of aerodynamic properties of the aeroplane as a whole—has been attained, thus ensuring safe and easy aeroplane-handling.

Some elements of the disclosed aerodynamic configuration of the airframe can be used in the designs of ground-effect machines, hovercrafts, hydroplaning vessels and hydrofoil crafts, as well as in class racing cars.

I claim:

1. A box-wing light-duty aircraft comprising:

a fuselage having longitudinally a front portion, a central portion and a tail portion;

a pusher propeller in a ring of said tail portion of said fuselage;

articulated wings respectively on opposite sides of said fuselage, each of said wings having first and second wing segments of opposite wing sweeps spaced longitudinally to form a rhombus in plan and spaced heightwise, each of said first wing segments having one end secured to said fuselage and an opposite-end tip;

first and second pylons having opposite ends connected to said tips of said first and second wing segments of said wings to form respective trapezoids in a front view;

pitch control means on said front portion of said fuselage;

first heading control means on said tail portion of said fuselage;

second heading control means respectively on said pylons; and third heading control means disposed from said tail portion of said fuselage for being in air flow created by said pusher propeller.

2. A light aircraft with an articulated wing in a triplane arrangement, comprising:

a fuselage having a longitudinal axis, nose portion, central portion and tail portion, an articulated wing consisting of two high-mounted wings having one type of sweep and two low-mounted wings having a reverse type sweep, disposed in corresponding first and second planes, spaced in a vertical direction relative to said fuselage and spaced one relative to the other along said longitudinal axis of said fuselage so that said articulated wing in plan forms a rhombus, each said low-mounted wing having one end secured to said fuselage, and a tip, a ring disposed in said tail portion of said fuselage and encompassing said tail portion of said fuselage, a pusher propeller disposed coaxially in said ring, each said high-mounted wing having one end secured to said ring and a tip, first and second pylons, each of which having first and second ends, said first end of said first pylon being connected to said tip of one of said low-mounted wings, and said second end of said first pylon being connected to said tip of one of said high-mounted wings, so that an isosceles trapezoid is formed in a front view, said first end of said second pylon being connected to said tip of other of said low-mounted wings, and said second end of said second pylon being connected to said tip of other of said high-mounted wings, so that an isosceles trapezoid is formed in a front view, pitch control means disposed in said nose portion of said fuselage, first heading control means disposed in said tail portion of said fuselage, second heading control means disposed on each of said pylons, third heading control means disposed in air flow created by said pusher propeller.

3. A light aircraft according to claim 2, wherein said pitch control means comprises two all-swivelling wings secured in said nose portion of said fuselage, said all-swivelling wings being positioned in a third plane.

4. A light aircraft according to claim 2, which comprises a fin positioned in said tail portion of said fuselage above said ring, and first heading control means disposed in said tail portion of said fuselage being disposed on said rudder above said ring and comprising a heading control rudder.

5. A light aircraft according to claim 2, wherein said second heading control means comprises two heading control rudders, each of which being disposed on a corresponding said pylon.

6. A light aircraft according to claim 2, wherein said third heading control means comprises a stream control rudder secured on a lower part of said fin and disposed behind said ring in an air flow created by said pusher propeller.

7. A fight aircraft according to claim 2, wherein said high-mounted wings are swept-forward, and said low-mounted wings are swept-back.

8. A light aircraft according to claim 2, wherein the height of each of said pylons is approximately equal to the length of the end chord of a wing.

9. A light aircraft according to claim 4, wherein said vertical stabilizer is made all-swivelling.

10. A light aircraft with an articulated wing in a triplane arrangement, comprising:

a fuselage having a longitudinal axis, nose portion, central portion and tail portion, an articulated wing consisting of two high-mounted wings having one type of sweep and two low-mounted wings having a reverse type sweep, disposed in corresponding first and second planes, spaced in a vertical direction relative to said fuselage and spaced one relative to the other along said longitudinal axis of said fuselage so that said articulated wing in plan forms a rhombus, a ring disposed in said tail portion of said fuselage and encompassing said tail portion of said fuselage, a pusher propeller disposed coaxially in said ring, each said low-mounted wing having one end, secured in said tail portion of said fuselage to a lower part of said ring, and a tip, each said high-mounted wing having one end, secured in said middle portion of said fuselage to its upper part, and a tip, first and second pylons, each of which having first and second ends, said first end of said first pylon being connected to said tip of one of said low-mounted wings, and said second end of said first pylon being connected to said tip of one of said high-mounted wings so that an isosceles trapezoid is formed in a front view, said first end of said second pylon being connected to said tip of other of said low-mounted wings, and said second end of said second pylon being connected to said tip of other of said high-mounted wings so that an isosceles trapezoid is formed in a front view, pitch control means disposed in said nose portion of said fuselage, first heading control means disposed in said tail portion of said fuselage, second heading control means disposed on each of said pylons, third heading control means disposed in air flow created by said pusher propeller.

11. A fight aircraft according to claim 10, wherein said high-mounted wings are swept-back, and said low-mounted wings are swept-forward.

* * * * *